(12) United States Patent
Wilson et al.

(10) Patent No.: US 10,228,071 B2
(45) Date of Patent: Mar. 12, 2019

(54) PINCH VALVE FOR DISPENSING LIQUID

(71) Applicant: A.C. Dispensing Equipment Inc., Lower Sackville (CA)

(72) Inventors: Avery Wilson, Annapolis Royal (CA); Brian Gay, Enfield (CA); Derek Cole, Lower Sackville (CA); Jeffrey Tofflemire, Head of Chezzetcook (CA); Ian Maclean, Fall River (CA); Ronald Shore, Oakfield (CA)

(73) Assignee: A.C. Dispensing Equipment Inc., Lower Sackville (CA)

( * ) Notice: Subject to any disclaimer, the term of this patent is extended or adjusted under 35 U.S.C. 154(b) by 0 days.

(21) Appl. No.: 15/339,038

(22) Filed: Oct. 31, 2016

(65) Prior Publication Data
US 2017/0122449 A1 May 4, 2017

Related U.S. Application Data

(60) Provisional application No. 62/248,747, filed on Oct. 30, 2015.

(51) Int. Cl.
| | |
|---|---|
| *F16K 7/04* | (2006.01) |
| *F16K 27/02* | (2006.01) |
| *B67D 1/00* | (2006.01) |
| *B67D 3/04* | (2006.01) |
| *B67D 1/07* | (2006.01) |

(52) U.S. Cl.
CPC ........ *F16K 27/0236* (2013.01); *B67D 1/0082* (2013.01); *B67D 3/041* (2013.01); *F16K 7/04* (2013.01); *B67D 1/07* (2013.01); *B67D 2001/0089* (2013.01); *B67D 2001/0094* (2013.01)

(58) Field of Classification Search
CPC .......... F16K 7/063; F16K 7/066; F16K 7/045; F16K 31/602; F16K 7/04; B67D 1/07; B67D 2001/0094; B67D 2001/0089; B67D 1/0082
USPC .......................... 251/7, 9, 4; 222/185.1, 517
See application file for complete search history.

(56) References Cited

U.S. PATENT DOCUMENTS

| | | | |
|---|---|---|---|
| 2,718,985 A * | 9/1955 | Tamminga | B67D 3/00 137/375 |
| 2,806,482 A * | 9/1957 | Norris | B67D 3/041 137/376 |
| 3,572,407 A | 3/1971 | Clifford | |
| 3,982,724 A | 9/1976 | Citrin | |
| 4,807,845 A | 2/1989 | Darnell | |
| 5,265,772 A | 11/1993 | Bartasevich et al. | |

(Continued)

OTHER PUBLICATIONS

Canadian Patent Application No. 2,946,978, Office Action dated Nov. 7, 2017.

(Continued)

*Primary Examiner* — Umashankar Venkatesan
(74) *Attorney, Agent, or Firm* — Borden Ladner Gervais LLP; Louis B. Allard

(57) ABSTRACT

A pinch valve has an insert housed in a holder. The insert and the holder are shaped to receive a dispensing tube and the insert can rotate within the holder and around the dispensing tube. The insert can be rotated to have the pinch valve in a release configuration where the insert can be moved downward and out of the holder to allow for cleaning of the insert and holder.

17 Claims, 7 Drawing Sheets

(56) References Cited

U.S. PATENT DOCUMENTS

Figure 1:
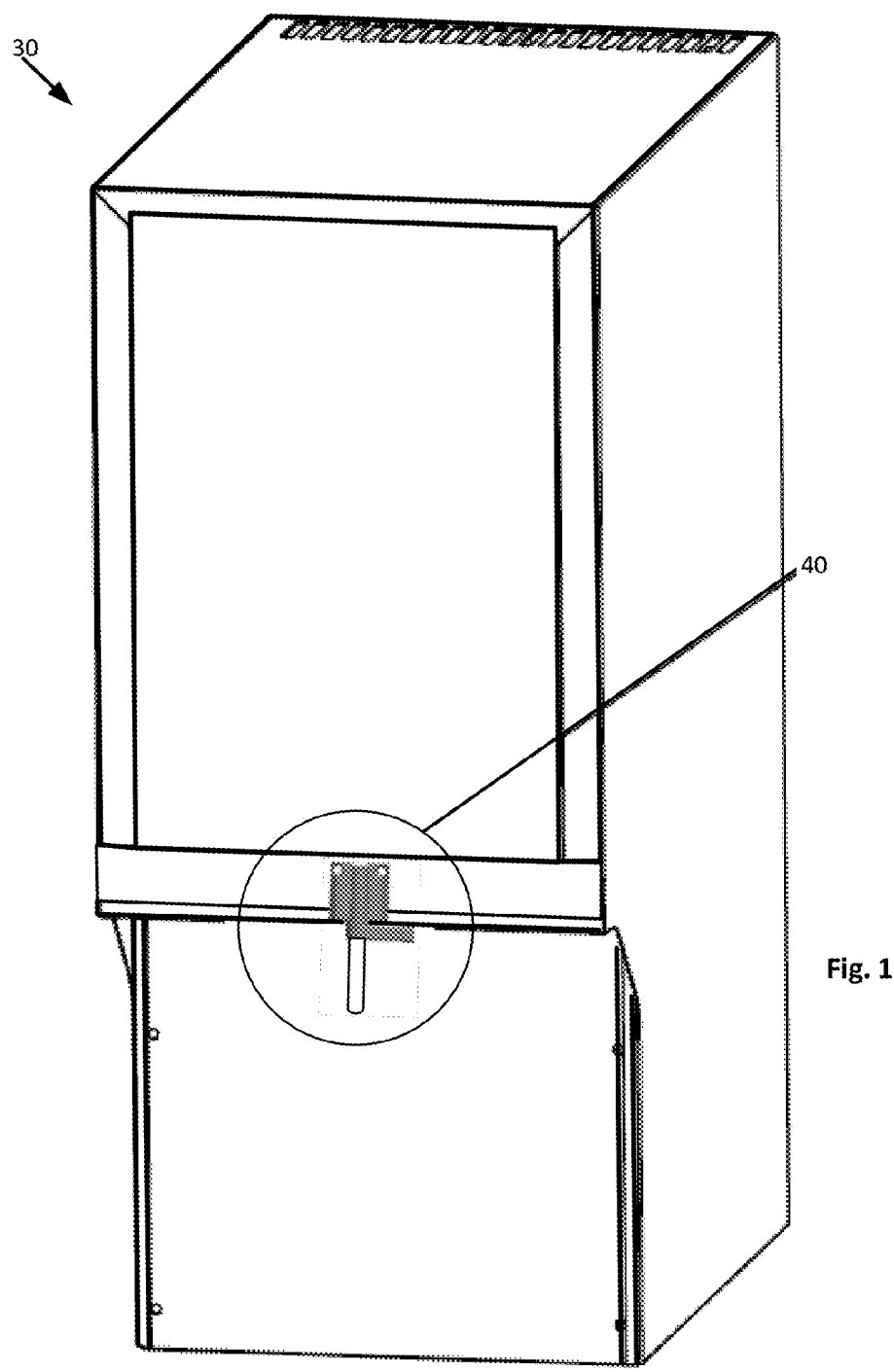

| | | |
|---|---|---|
| 5,938,078 A | 8/1999 | Dorsey et al. |
| 6,120,065 A | 9/2000 | Chen |
| 7,104,275 B2 | 9/2006 | Dille |
| 8,376,310 B2 | 2/2013 | Veltrop et al. |
| 8,979,070 B2 | 3/2015 | Keizer et al. |
| 9,638,218 B2 | 5/2017 | Jung et al. |
| 2006/0011873 A1* | 1/2006 | Clarke ................ A61M 39/287 251/4 |
| 2006/0145105 A1 | 7/2006 | Ishida et al. |
| 2011/0095212 A1 | 4/2011 | Brieske |

OTHER PUBLICATIONS

U.S. Appl. No. 15/339,083, Non-Final Office Action dated Nov. 2, 2017.

U.S. Appl. No. 15/339,205, Non-Final Office Action dated Nov. 3, 2017.

\* cited by examiner

PINCH VALVE FOR DISPENSING LIQUID

FIELD

The present disclosure relates generally to pinch valves. More particularly, the present disclosure relates to pinch valves used in liquid dispensers.

BACKGROUND

Cleaning existing liquid dispenser pinch valves often requires that the entire assembly of the pinch valve be taken apart, using tools to remove fasteners, prior to cleaning. This requires time, tools, training, and tracking of the fasteners so they do not get lost. As such, the liquid dispensers can experience considerable downtime, which, in coffee shops, can result in customers desiring cream dispensed in their coffee, to wait longer than necessary.

Additionally, in some instances, existing pinch valves can be prone, when in their open configuration, to being damaged either by the door of the liquid dispenser to which the pinch valve is connected, or by the heavy bag containing milk or cream as it is loaded into the liquid dispenser.

Further, existing pinch valves do not allow easy and quick removal/insertion of dispensing tubes when replacing a spent liquid container from a liquid-dispensing machine and installing a replacement liquid container.

Therefore, improvements in pinch valves are desirable.

SUMMARY

In a first aspect, the present disclosure provides a pinch valve for a liquid-dispensing unit. The pinch valve comprises a holder and an insert. The holder is configured to hold the insert, the holder and the insert are configured to define a passageway when the insert is held by the holder. The passageway is to contain a dispensing tube when the insert is held by the holder. The holder and the insert are further configured for rotation of the insert with respect to the holder with the rotation being about an axis collinear with the passageway.

In a second aspect, there is provided a pinch valve for a liquid-dispensing unit. The pinch valve comprises a holder and an insert. The holder is configured to hold the insert. The holder and the insert are configured to define a passageway when the insert is held by the holder. The passageway is to surround a dispensing tube. The holder and the insert are further configured for rotation of the insert with respect to the holder. The rotation of the insert is about the dispensing tube when the dispensing tube is disposed in the passageway.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 1 shows a liquid-dispensing machine equipped with an embodiment of a pinch valve in accordance with the present disclosure.

FIG. 2 shows a top front perspective view of an embodiment of a pinch valve in accordance with the present disclosure, with an insert of the pinch valve in an installed position.

FIG. 3 shows another top front perspective view of the pinch valve of FIG. 1, with the insert of the pinch valve in an intermediary (or raised) position.

FIG. 4 shows another top front perspective view of the pinch valve of FIG. 1, with the insert of the pinch valve in an open position.

FIG. 5 shows another top front perspective view of the pinch valve of FIG. 1, with the insert of the pinch valve in a removed position.

FIG. 6 shows another top front perspective view of the pinch valve of FIG. 1, with a dispensing tube removed from the pinch valve.

FIG. 7 shows a front elevation view of the pinch valve of the FIG. 2, with the insert in the installed position.

FIG. 8 shows a front elevation view of the pinch valve of the FIG. 2, with the insert in the intermediary position.

FIG. 9 shows a front elevation view of the pinch valve of the FIG. 2, with the insert in the open position.

FIG. 10 shows a front elevation view of the pinch valve of the FIG. 2, with the insert in the removed position.

FIG. 11 shows a top front perspective view of the holder of the pinch valve of FIG. 2.

FIG. 12 shows a front elevation view of the holder of FIG. 11.

FIG. 13 shows a top view of the holder of FIG. 11.

FIG. 14 shows a side view of the holder of FIG. 11.

FIG. 15 shows a top front perspective view of the insert of the pinch valve of FIG. 2.

FIG. 16 shows a front elevation view of the insert of FIG. 15.

FIG. 17 shows a top view of the insert of FIG. 15.

FIG. 18 shows a side view of the insert of FIG. 15.

DETAILED DESCRIPTION

FIG. 1 shows a top front perspective view of a liquid-dispensing machine 30, which can also be referred to as a liquid-dispensing unit, fitted with an embodiment of a pinch valve 40 in accordance with the present disclosure. The liquid-dispensing machine 30, equipped with the pinch valve 40, allows for metered dispensing of liquids such as, for example, milk and cream, into hot beverages such as, for example, tea and coffee.

FIG. 2 shows a top front perspective view of the pinch valve 40. The pinch valve 40 can be used with any type of liquid-dispensing machine that has a collapsible dispensing tube connecting a body of fluid contained in a container to an outside of the container. The pinch valve 40 is shown with a dispensing tube 42 installed therein. The pinch valve 40 can be secured to the liquid-dispensing machine 30 (shown at FIG. 1) through any suitable means such as, bolts, screws, adhesives, etc. When fasteners such as screws or bolts are used, these can be received through fastener apertures 41 and screwed into apertures defined on the dispensing machine.

The pinch valve 40 comprises a holder 44 and a rotatable insert 46. In FIG. 2, the rotatable insert 46 is shown installed in the holder 44, in an installed position. The rotatable insert 46 has a handle 48 that allows a user to rotate and to manipulate the rotatable insert 46. The pinch valve 40 is designed to work with a plunger assembly, for example, plunger assembly 50. The plunger assembly is used to pinch the dispensing tube 42 between a tip of the plunger and an inner wall portion of the rotatable insert 46. The inner wall portion can also be referred to as a striking surface, configured to receive strikes from the plunger. The shape of the tip of the plunger and that of the inner wall portion can be complementary to each other in order to pinch the dispensing tube sufficiently to prevent liquid from flowing through the dispensing tube. For example, when the tip of the plunger is flat, the inner wall portion can also be flat. As another example, when the tip of the plunger is convexly rounded, the inner wall portion is concavely rounded to receive the tip of the plunger. The shape of the tip of the plunger and that of the inner wall portion of the insert need not be exactly complementary; rather, their respective shapes (geometries) must be such that the plunger tip pushing a dispensing tube against the inner wall portion prevents liquid from flowing in the dispensing tube. The handle 48 can have any suitable shape that allows a user to rotate and manipulate the insert 46.

The holder 44 is configured to hold the insert 46. The holder 44 and the insert are configured to define a passageway 43 when the insert 46 is held by the holder 44. The passageway 43 is to contain the dispensing tube 42 when the insert is held by the holder. The holder 44 and the insert 46 are further configured for the insert 46 to be rotated with respect to the holder 44 about a rotation axis 47, which is collinear with the center of the passageway 43, with the center of the passageway being the same as the center of a dispensing tube when the dispensing tube is installed in the pinch valve. That is, the passageway 43 is parallel to the rotation axis 47 and the insert 46 is arranged to be rotated about the rotation axis 47. The rotation of the insert 46 can be said to be about the dispensing tube 42 when the dispensing tube 42 is disposed in the passageway 43.

Figure 2:
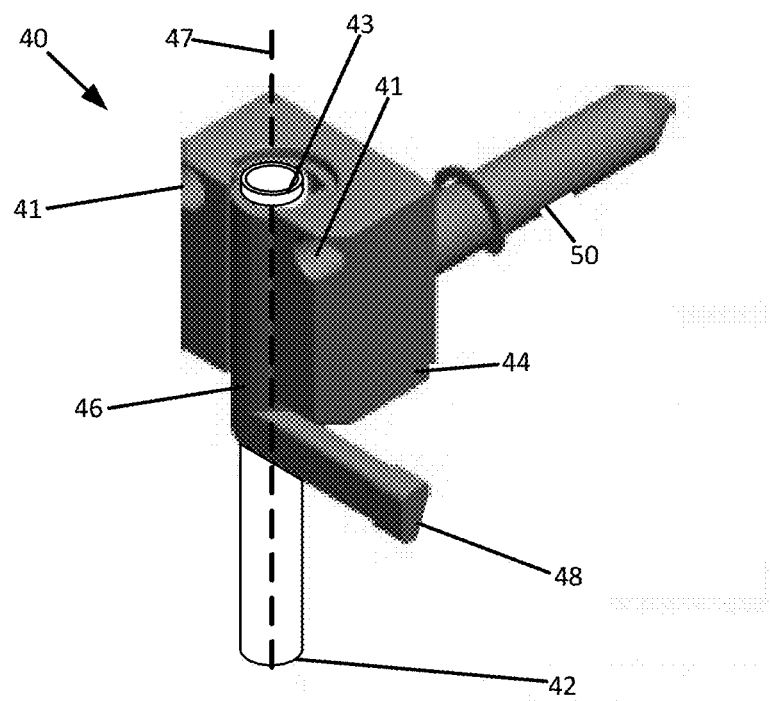
Figure 3:
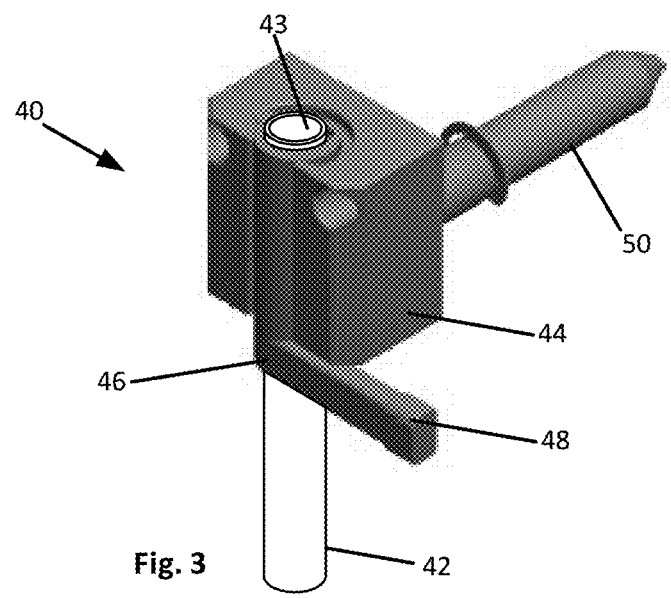

FIG. 3 shows the pinch valve 40 in an intermediary position (the pinch valve 40 is in an unlocked configuration) where the rotatable insert 46 is in a raised position with respect to the installed position of the rotatable insert 46 shown at FIG. 2. As will be described below, in the present embodiment, the rotatable insert 46 and the holder 44 define cooperating features, or complementary mating features, that prevent (that block) the rotation of the rotatable insert 46 with respect to the holder 44 when the rotatable insert 46 is in the installed position shown at FIG. 2 (that is, when the complementary mating features are mated), but that allow the rotation of the rotatable insert 46, from the intermediary position and with respect to the holder 44, when the rotatable insert 46 is in the intermediary position shown at FIG. 3. When the complementary mating features of the holder 44 and the insert 46 are mated, the pinch valve 40 can be said to be in a locked configuration.

As such, the holder 44 and the insert 46 are configured so that when the pinch valve 40 is in the locked configuration, the configuration can be changed to an unlocked configuration, which is shown at FIG. 3, where the complementary mating features are not mated and the insert 46 can be rotated with respect to the holder 44.

In other embodiments, the holder and the insert may be free of such complementary mating features and be configured to allow the rotation of the insert 46 with respect to the holder 44 when the insert 46 is in the installed position.

The pinch valve 40, the holder 44 and the insert 46 can be made of any suitable material such as, for example, acetal, high-density polyethylene, aluminum etc. In some embodiments, the insert 46 can be thermally conductive and the holder can have a thermally conductive member in thermal contact with the insert 46 to thermally connect the insert 46 to a cooling device. This allows for cooling of the dispensing tube placed in the insert 46.

Figure 4:
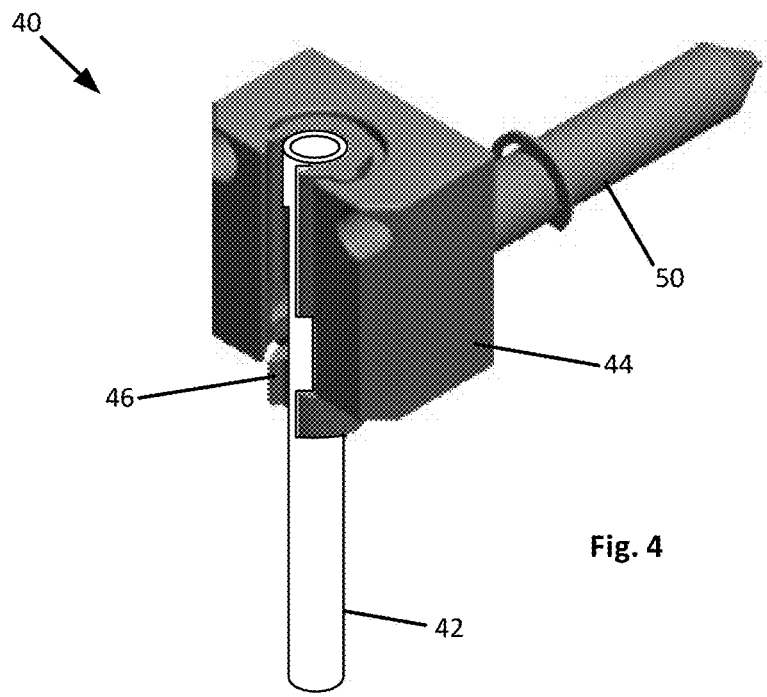

FIG. 4 shows the pinch valve 40 in an open position, which can also be referred to as a release configuration. In this configuration, the dispensing tube 42 can be released (i.e. removed) from the pinch valve 40 (and from the insert 46). The handle 48 of the rotatable insert 46 is not shown in FIG. 4. In FIG. 4, the insert 46 can be said to be translationally engaged with the holder 44 in that the insert 46 can be translated out of the holder 44. Similarly, in FIG. 3, the insert 46 can be said to be translationally engaged with the holder 44 in that the insert 46 can be translated upward from the locked position to the intermediary position.

Figure 5:
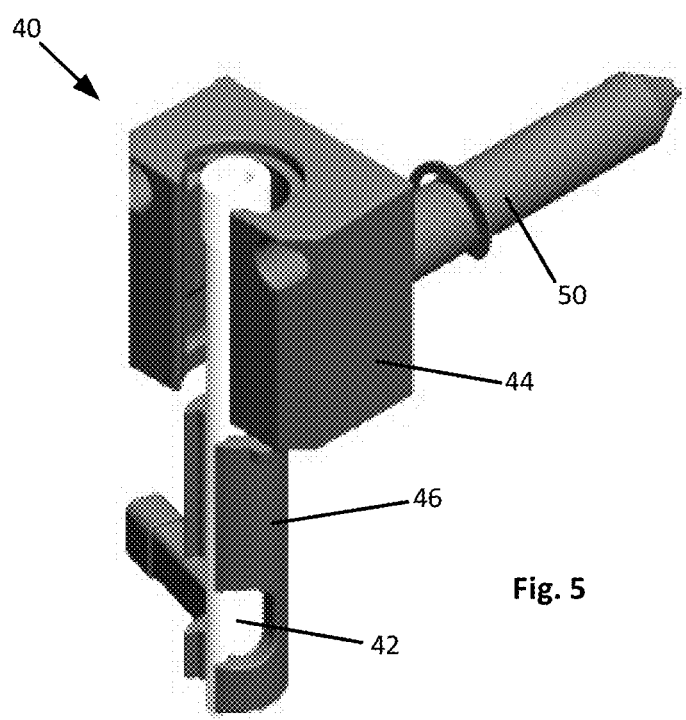
Figure 6:
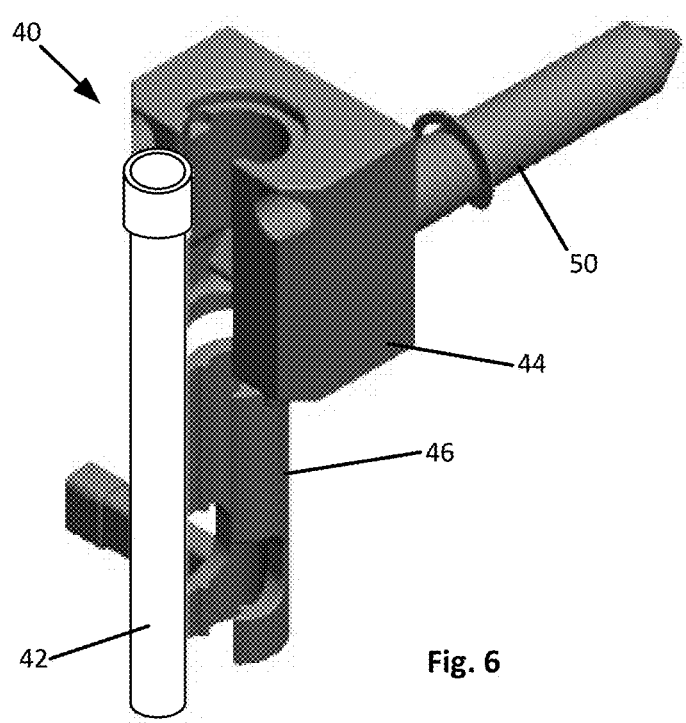

The pinch valve 40 is configured such that, from the open position shown at FIG. 4, the rotatable insert 46 can be translated vertically downwards out of the holder 44, such as shown at FIG. 5, where the rotatable insert was moved downwards from the open position shown at FIG. 4 to the removed position shown at FIG. 5. FIG. 6 shows the pinch valve 40 in the open position, with the dispensing tube 42 removed from the pinch valve 40 and the insert 46.

Returning to FIG. 4, the pinch valve 40 can be said to be in an exposed configuration where the dispensing tube 42 is exposed and can be removed by a user pulling the dispensing tube 42 out of the insert 46.

Figure 7:
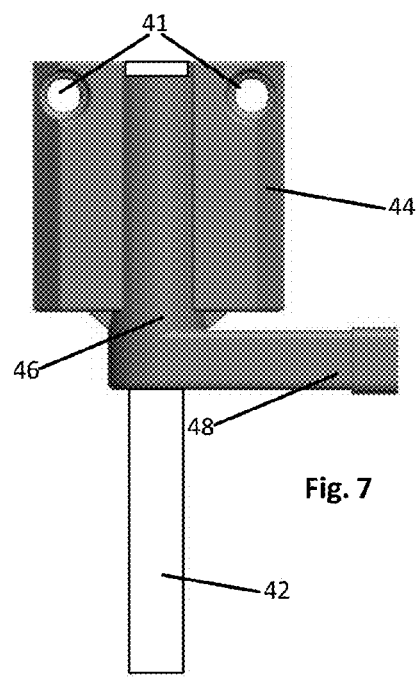
Figure 8:
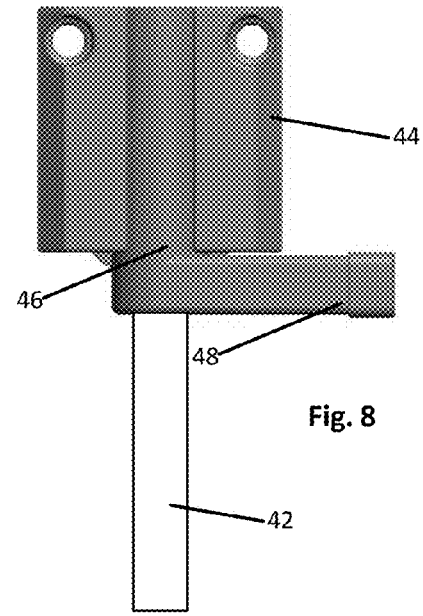
Figure 9:
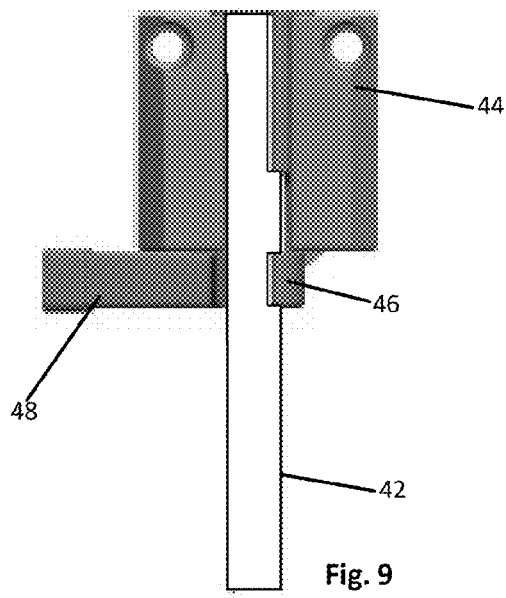
Figure 10:
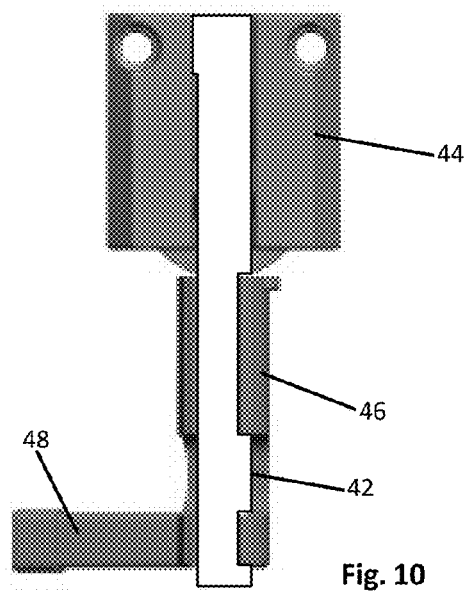

FIG. 7 shows a front elevation view of the pinch valve 40 in the installed position (the installed position is also shown at FIG. 2). FIG. 8 shows a front elevation view of the pinch valve 40 but this time in the intermediary position (the intermediary position is also shown at FIG. 3), where the rotatable insert 46 is in a raised position with respect to the position of the rotatable insert 46 shown at FIG. 7. FIG. 9 shows a front elevation view of the pinch valve 40 in the open position (the open position is also shown at FIG. 4). FIG. 10 shows a front elevation view of the pinch valve 40 with the rotatable insert 46 in the removed position (the removed position is also shown at FIG. 5).

Figure 11:
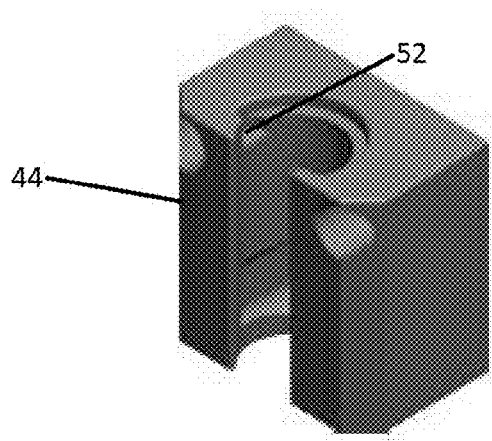
Figure 12:
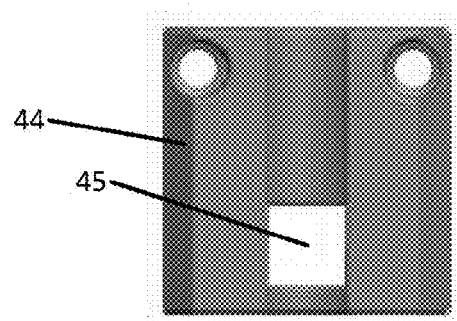
Figure 13:
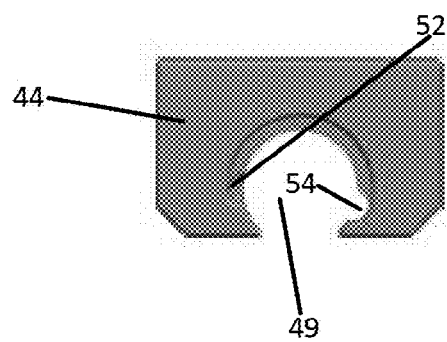
Figure 14:
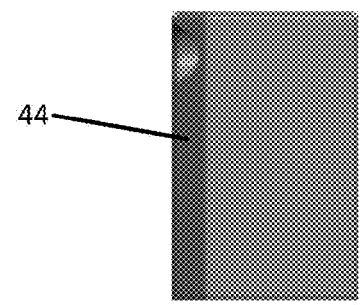

FIG. 11 shows a top front perspective view of the holder 44. FIG. 12 shows a front elevation view of the holder 44. FIG. 13 shows a top view of the holder 44, and FIG. 14 shows a side view of the holder 44.

FIG. 12 shows an opening 45 that allows the passage of a plunger tip (not shown) of the plunger assembly 50 shown at FIG. 2. The opening (or recess) 45 is configured to receive a plunger. The plunger is to pinch the dispensing tube against the insert (e.g., against an inner wall of the insert 46) to prevent liquid from flowing through the dispensing tube. Even though the opening 45 is shown as a being a square, openings of any suitable shape are to be considered within the scope of the present disclosure. Further, the opening does need not to form a closed form.

As shown in FIGS. 11 and 13, the holder 44 defines an indentation 52 that can receive a correspondingly dimensioned projection defined by the rotatable insert 46. When the rotatable insert 46 is in the installed position (shown, for example, at FIG. 2), the projection sits in the indentation 52 and the rotatable insert 46 is prevented from being rotated with respect to the holder 44 due to the projection being held by the indentation 52. For the rotatable insert 46 to be allowed to be rotated, the rotatable insert 46 must first be raised, with respect to the holder 44, to a height where the projection is raised out of the indentation 52. The projection defined by the rotatable insert 46 is described in further detail below.

As shown at FIG. 13, the holder 44 also defines a groove 54, dimensioned to allow passage of the projection defined by the rotatable insert 46 as the rotatable insert 46 is moved downward (translated downward) with respect to the holder 44 from the open position (see, for example, FIG. 9) to the removed position (see, for example, FIG. 10). Further, the holder 44 defines a recess 49 dimensioned (configured) to receive the insert 46 for rotation of the insert 46 in the recess 44.

Figure 15:
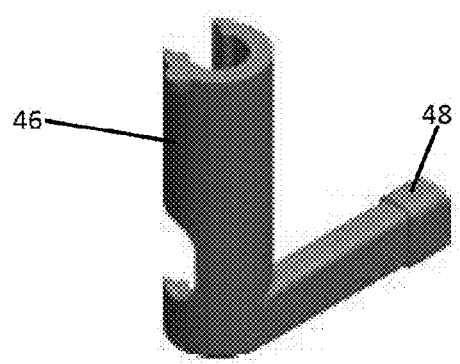
Figure 16:
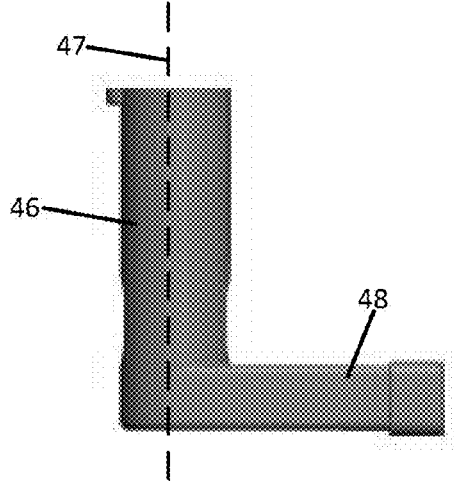
Figure 17:
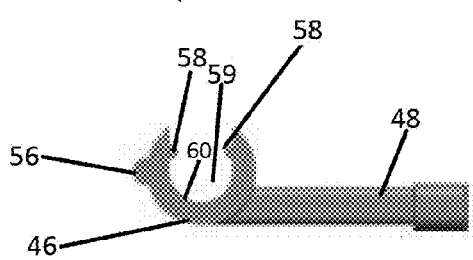
Figure 18:
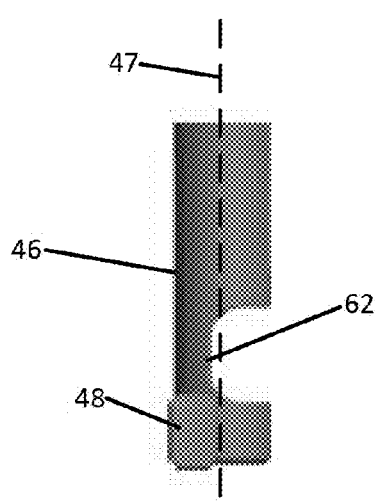

FIG. 15 shows a top front perspective view of the rotatable insert 46. FIG. 16 shows a front elevation view of the rotatable insert 46. FIG. 17 shows a top view of the rotatable insert 46. FIG. 18 shows a side view of the rotatable insert 46.

As shown at FIG. 17, the rotatable insert 46 defines a projection 56, which cooperates with the indentation 52 defined by the holder 44. The projection 56 is a mating feature of the insert 46 and the indentation 52 is a mating feature of the holder 44. The projection 56 and the indentation 52 are complementary mating features. As stated above, when the rotatable insert 46 is in the installed position (shown, for example, at FIG. 2), the projection 56 sits in the indentation 52 and the rotatable insert 46 is prevented from being rotated due to the projection 56 being held by the indentation 52. For the rotatable insert 46 to be allowed to be rotated, the rotatable insert 46 must first be raised, with respect to the holder, to a height where the projection 56 is raised above the indentation 52. As will be understood by the skilled worker, any suitable complementary mating features can be defined or formed on the insert 46 and the holder 44 in order to releasably interlock the insert and the holder.

FIG. 17 also shows ribs 58 formed on an inner wall 60 of the rotatable insert 46. The ribs 58 are for releasably holding the dispensing tube 42 (shown at FIG. 2) in the rotatable insert 46. The dispensing tube 42, which is deformable (collapsible), can be pushed into the rotatable insert 56, passed the ribs 58, to be releasably held by the rotatable insert 46. As such, the insert can be said to be configured to releasably retain therein the dispensing tube 42. In addition to a rib or to multiple ribs, any type of protrusion, projection or protuberance, formed on the insert that can releasably retain the dispensing tube in the insert is to be considered within the scope of the present disclosure.

FIG. 17 also shows an opening 59 in which the dispensing tube is to be retained. The opening 59 and the recess 49 of the holder 44 (shown at FIG. 13) together form the passageway 43 shown at FIG. 2.

FIG. 18 shows a recess 62 defined by the rotatable insert 46. The recess 62 allows the rotatable insert 46 to be rotated past the plunger tip (not shown) when the rotatable insert 46 is rotated from the raised position (shown at FIG. 3), to the open position (shown at FIG. 4). The recess 62 also allows for prehension of the dispensing tube for removal of the dispensing tube from the insert 46.

FIGS. 16 and 18 also show the rotation axis 47, which is centered in the recess 59 such that a dispensing tube positioned in the pinch valve 40 is centered on the rotation axis 47.

Plunger assemblies of various types can be used in the pinch valve without departing from the scope of the present disclosure. For example, a solenoid-activated plunger assembly, a manually activated plunger assembly, a stepper motor plunger assembly, or any other suitable electromechanical plunger assembly can be used.

Advantageously, the pinch valve of the present disclosure has an insert that can be moved out of the holder by translation of the insert downward. This greatly reduces the risk of damage to the pinch valve in that the likelihood of the door of the liquid dispenser unit interfering with the insert when the pinch valve is open for removal of the dispensing tube is essentially nil. Further, the likelihood of the bag of liquid to be dispensed interfering with the inset when inserting the bag into the liquid dispenser unit is also greatly reduced.

Additionally, the pinch valve of the present disclosure can be configured to be retrofitted, in the field, to existing liquid-dispensing machines and, the pinch valve can be configured (dimensioned) to use existing closure and valve body thermally conductive inserts. Similarly, the pinch valve of the present disclosure can be configured to use the existing reed switch assemblies already in the field.

Further, pinch valve of the present disclosure does not require any tool for servicing or cleaning and, can be opened/closed with one hand.

Furthermore, there is no need to fasten/unfasten fasteners to close/open the pinch valve of the present disclosure.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A pinch valve for a liquid-dispensing unit, the pinch valve comprising:
   a holder;
   an insert, the holder configured to hold the insert, the holder and the insert configured to define a passageway when the insert is held by the holder, the passageway to contain a dispensing tube when the insert is held by the holder, the holder and the insert further configured for rotation of the insert with respect to the holder, the rotation being about an axis collinear with the passageway, wherein the holder and the insert define complementary mating features that, when mated, interlock the insert and the holder to block the rotation of the insert with respect to the holder; and
   a handle fixedly attached to the insert, at a bottom portion of the insert, for rotating the insert in the holder.

2. The pinch valve of claim 1 further comprising a protrusion formed on the insert, the protrusion extending laterally away from the inset, wherein the holder defines an indentation, the indentation configured to receive the protrusion, the protrusion and the indentation being the complementary mating features.

3. The pinch valve of claim 2 wherein the pinch valve is in a locked configuration when the protrusion and the indentation are mated, the holder and the insert being structured for reconfiguration of the pinch valve from the locked configuration to a release configuration where the insert is translationally engaged in the holder for downward translation of the insert out of the holder.

4. The pinch valve of claim 2 wherein the pinch valve is in a locked configuration, when the protrusion and the indentation are mated, the holder and the insert being structured for reconfiguration of the pinch valve from the locked configuration to an unlocked configuration for rotation of the insert with respect to the holder.

5. The pinch valve of claim 4 wherein, when the pinch valve is in the unlocked configuration, the holder and the insert are arranged for rotation of the insert to an exposed passageway position, the dispensing tube, when contained in the passageway, being exposed for removal from the passageway when the insert is in the exposed passageway position.

6. The pinch valve of claim 1 wherein the insert is configured to releasably retain therein the dispensing tube.

7. The pinch valve of claim 6 wherein the insert defines a recess and a protrusion, the recess to receive the dispensing tube, the protrusion to interfere with the dispensing tube, when the dispensing tube is installed in the recess, to retain the dispensing tube in the recess.

8. The pinch valve of claim 7 wherein the protrusion is a rib parallel to the passageway.

9. The pinch valve of claim 1 wherein the insert defines a recess to access the dispensing tube, when the dispensing tube is installed in the insert, for prehension of the dispensing tube to remove the dispensing tube from the insert.

10. The pinch valve of claim 1 wherein the holder defines a fastener aperture to receive a fastener to fasten the holder to the liquid dispensing unit.

11. The pinch valve of claim 1 wherein the holder defines an opening for receiving a plunger, the plunger to pinch the dispensing tube against the insert to prevent liquid from flowing through the dispensing tube.

12. The pinch valve of claim 1 wherein the holder defines a recess, the insert configured to fit in the recess for rotation of in the recess.

13. A pinch valve for a liquid-dispensing unit, the pinch valve comprising:
a holder;
an insert, the holder configured to hold the insert, the holder and the insert configured to define a passageway when the insert is held by the holder, the passageway to surround a dispensing tube, the holder and the insert further configured for rotation of the insert with respect to the holder, the rotation of the insert being about the dispensing tube when the dispensing tube is disposed in the passageway, wherein the holder and the insert define complementary mating features that, when mated, interlock the insert and the holder to block the rotation of the insert with respect to the holder; and
a handle fixedly attached to the insert, at a bottom portion of the insert, for rotating the insert in the holder.

14. The pinch valve of claim 13 further comprising a protrusion formed on the insert, the protrusion extending laterally away from the insert, wherein the holder defines an indentation, the indentation configured to receive the protrusion, the protrusion and the indentation being the complementary mating features.

15. The pinch valve of claim 14 wherein the pinch valve is in a locked configuration when the protrusion and the indentation are mated, the holder and the insert being structured for reconfiguration of the pinch valve from the locked configuration to a release configuration where the insert is translationally engaged in the holder for downward translation of the insert out of the holder.

16. The pinch valve of claim 14 wherein the pinch valve is in a locked configuration, when the protrusion and the indentation are mated, the holder and the insert being structured for reconfiguration of the pinch valve from the locked configuration to an unlocked configuration for rotation of the insert with respect to the holder.

17. The pinch valve of claim 16 wherein, when the pinch valve is in the unlocked configuration, the holder and the insert are arranged for rotation of the insert to an exposed passageway position, the dispensing tube, when contained in the passageway, being exposed for removal from the passageway when the insert is in the exposed passageway position.

* * * * *